C. R. CLARK.
STRETCHER.
APPLICATION FILED AUG. 10, 1915.
1,159,746.
Patented Nov. 9, 1915.
2 SHEETS—SHEET 2.
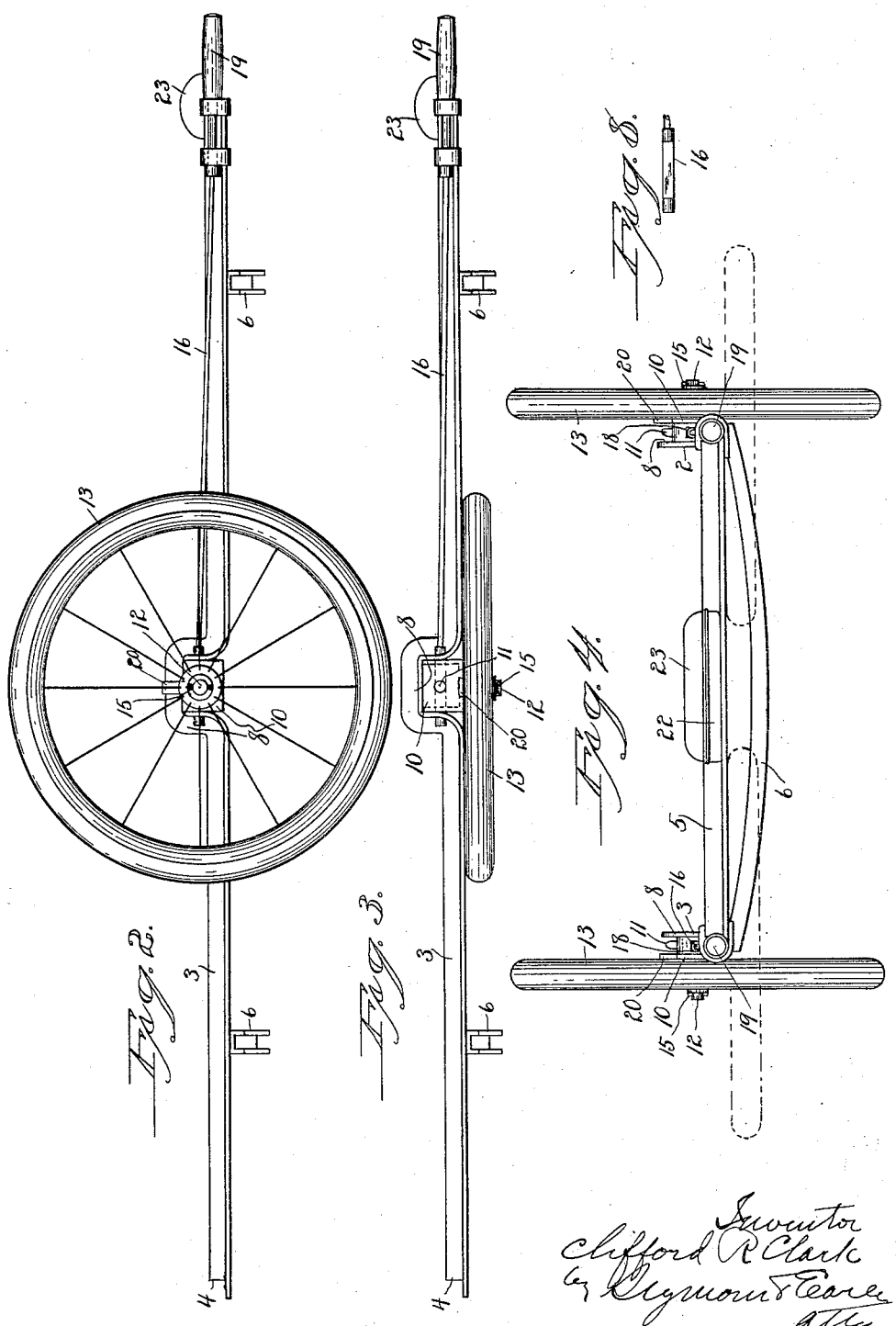

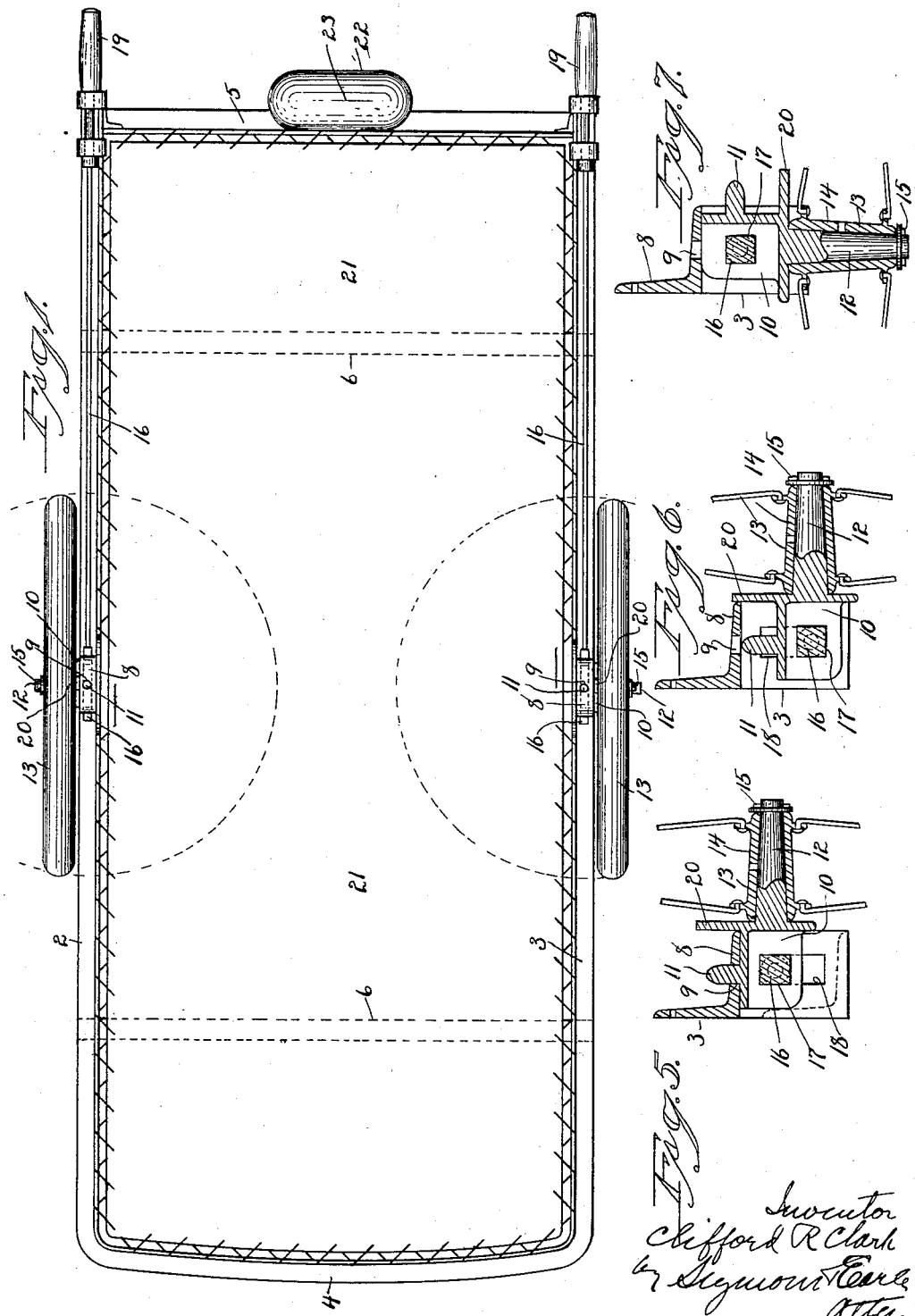

UNITED STATES PATENT OFFICE.

CLIFFORD R. CLARK, OF NEW HAVEN, CONNECTICUT, ASSIGNOR OF ONE-HALF TO FRED H. LEONARD, OF WEST HAVEN, CONNECTICUT.

STRETCHER.

1,159,746.  Specification of Letters Patent.  Patented Nov. 9, 1915.

Application filed August 10, 1915. Serial No. 44,791.

*To all whom it may concern:*

Be it known that I, CLIFFORD R. CLARK, a citizen of the United States, residing at New Haven, in the county of New Haven and State of Connecticut, have invented a new and useful Improvement in Stretchers; and I do hereby declare the following, when taken in connection with the accompanying drawings and the characters of reference marked thereon, to be a full, clear, and exact description of the same, and which said drawings constitute part of this application, and represent, in—

Figure 1 a top or plan view of a stretcher constructed in accordance with my invention. Fig. 2 a side view of the same. Fig. 3 a side view with the wheels in the folded position. Fig. 4 a rear end view. Fig. 5 a sectional view through one of the yokes and axle frames, showing the wheel in the open position. Fig. 6 a similar sectional view showing the frame lifted away from the axle frame. Fig. 7 a similar view indicated the wheel in the folded position. Fig. 8 a broken view of the outer end of one of the operating rods.

This invention relates to an improvement in stretchers, the object of the invention being to provide a stretcher with wheels on which it may be moved and which may, when desired, be folded beneath the stretcher; and the invention consists in the construction hereinafter described and particularly recited in the claims.

In carrying out my invention, I employ two side frames 2 and 3, which may be connected at one end by a forward bar 4 integral with the side bars or connected thereto, and at the opposite end by a rear bar 5 and by intermediate braces 6, if desired. Near the center of each side bar is an upwardly projecting yoke 8 in the top of which is a perforation 9 for the purpose as will hereinafter appear. Adapted to enter the yokes are axle frames 10 formed with upwardly projecting pins 11 adapted to enter the perforations 9. These axle frames carry axles 12 upon which wheels 13 are mounted, and preferably these axles and the hubs 14 of the wheels will be tapered so that the wheel is readily removed, and preferably the wheels will be held in place by keys 15. Passing through the axle frames are rods 16 which are preferably squared to fit square openings 17 in the box, or otherwise connected thereto. These rods project through slots 18 formed for them in the sides of the yoke, and these rods extend rearward and are provided with handles 19 by which they may be turned. The axle frames will also be provided with upwardly projecting fingers 20 which will strike the outer edge of the upper part of the yoke and project slightly above the upper ends of the pins 11. Preferably the braces 6 will project for some distance below the lower edge of the frame. Secured to the frame by lacings or otherwise, is a canvas sheet 21. In the normal position, as shown in Figs. 1 and 2 of the drawings, the pins 11 project through the perforations 9 so that the axle frames are locked in position so that the axles project outward from opposite sides of the stretcher, and so that the stretcher will be supported by the wheels.

When it is desired to fold the wheels the outer end of the frame may be allowed to rest upon the ground and the rear end raised by the handles 19 until the frame has been lifted off from the pins 11, as shown in Fig. 6 of the drawings. The handles will then be rotated so as to turn the axle frames downward as shown in Fig. 7 of the drawings, which folds the wheels beneath the stretcher as shown in Fig. 3 of the drawings. To bring the wheels in place after they have been folded, it is only necessary to raise the frame sufficiently high above the ground to allow the wheels to be turned outward, and then the handles rotated to turn the axle frames into a vertical position. When raised the finger 20 will strike the edge of the yoke, and guide the pins 11 into the perforations 9 as the frame is allowed to drop.

A stretcher thus constructed, is readily capable of carrying two persons, and may be easily moved by one man, thus permitting one man to accomplish the work usually done by four.

Preferably, and as herein shown, a box 22 will be attached to the frame between the handles to contain material for first aid, and the cover 23 of this box will be concavo-convex, adapting it to be used as a basin.

While this device is particularly adapted for use as a stretcher, it is evident that it might be used as a carriage for quick-firing guns, and for other purposes.

The frame may be made from light metal or wood, and with rubber tire wire wheels, may be easily transported; and in places where it is impracticable to roll the stretcher on its wheels, it may be carried like an ordinary stretcher.

I claim:—

1. A stretcher comprising a frame having side-bars, a yoke in said bars, an axle frame mounted in said yoke, wheels mounted on said axle frame, means for locking the axle frame in said yoke, and means for turning the axle frame.

2. A stretcher comprising a frame having side bars, said side bars formed with yokes, the sides of said yokes slotted and the tops formed with perforations, axle frames located in said yokes and formed with pins adapted to enter said perforations, wheels carried by said axle frames, rods extending through the slots in the yoke and engaging with said frame, and handles attached to the rear ends of said rods.

3. A stretcher comprising side bars each formed with a yoke, the sides of said yoke slotted and the tops formed with perforations, axle frames entering said yokes, said frames formed with upwardly projecting pins adapted to enter the perforations in the tops of the yokes, said frames also formed with upwardly projecting fingers, wheels mounted on said axle frame, a shaft passing through said yoke and interlocked with said axle frame, and handles applied to the rear ends of said rods.

CLIFFORD R. CLARK.

Copies of this patent may be obtained for five cents each, by addressing the "Commissioner of Patents, Washington, D. C."